Fig. 1.

July 15, 1930.   C. A. BULKELEY   1,770,765
CONTROL FOR AIR CONDITIONERS
Filed Dec. 14, 1928    3 Sheets-Sheet 3

Inventor
Claude A. Bulkeley
By Popp + Powers
Attorneys

Patented July 15, 1930

1,770,765

UNITED STATES PATENT OFFICE

CLAUDE A. BULKELEY, OF BUFFALO, NEW YORK, ASSIGNOR TO NIAGARA BLOWER COMPANY, OF BUFFALO, NEW YORK, A CORPORATION OF NEW YORK

CONTROL FOR AIR CONDITIONERS

Application filed December 14, 1928. Serial No. 325,940.

This invention relates to a control for air conditioners and more particularly to a hygrostat pilot control of temperature and humidity by means of which the temperature and relative humidity in the interior of the building or enclosure being conditioned is accurately maintained as desired and even in the event of failure of the heating or cooling means in the conditioner, the relative humidity will be maintained.

One of the principal objects of this invention is to provide a control system of this character which is extremely simple and inexpensive in construction and arrangement, which is responsive to slight changes in relative humidity and temperature so as to accurately maintain the desired conditions and which will function reliably and positively to maintain the desired condition of the room atmosphere at all times.

A further object is to provide such a conditioner which operates with a minimum expenditure of heating and cooling mediums such as steam and cold water, and even in the event of the failure of both of these will maintain the predetermined relative humidity, the maintenance of the relative humidity being of prime importance in various industries.

Another object is to provide a conditioner which is constructed in the form of a unitary structure, in which in particular, the control elements and the air compressor for the same are mounted on the conditioner and form a complete unit.

A further aim is to increase the sensitivity of the control instruments by forcing a draft of room air past their sensitive members and thereby insuring their rapid response to variations in room atmosphere and temperature conditions, the source of such air current being derived from the main suction fans which draw the atmosphere of the room through the conditioner for conditioning the same.

A further object is to so organize the control system that proper pressure and volumes of air in the control lines is insured for the responsive operation of the motors and diaphragm valves of the system.

In the accompanying drawings.

Similar reference numerals refer to similar parts in each of the several views.

In order to maintain a definite relative humidity in a room, there must be an exact amount of water vapor or moisture in the room at the required room temperature. As is well known, air will hold moisture in an amount depending on its temperature, the higher the temperature, the more moisture it will hold, the converse being true. Also if the air in the room is cooled to its dew point, it will be saturated with moisture or have 100% relative humidity. This is called its dew point since any further cooling of the air will cause moisture to be precipitated out of the air.

One of the easiest ways to maintain a given temperature and relative humidity in the room is to force the air in the room through a chamber containing a plurality of sprays of finely divided particles of water which insure the saturation of the air with water vapor at the temperature at which the air leaves the spray chamber. The saturated air is then heated to the degree necessary to maintain the room atmosphere at the desired temperature and is discharged into the room. The temperature of the air leaving the spray chamber is approximately the same as the average temperature of the spray water after it has passed through the spray chamber and it will therefore be apparent that by controlling the temperature of the spray water, the amount of water added to or conducted out of the air will be directly controlled since the air leaves the spray chamber saturated and at the temperature of the leaving spray water.

By the term "saturation" as herein used, is meant saturation at a temperature within one degree F. of the temperature of the air leaving the spray chamber.

Thus if it is desired to add moisture to the air, upon heating the spray water, the saturated air leaving the spray chamber will be at a higher temperature and consequently will have more moisture since the warmer air will hold more moisture than cooler air. In the same manner, if it is desired to condense moisture out of the air, the spray water is cooled below the dew point of the room atmosphere and since the air passing through the conditioner is cooled below its dew point, moisture will be precipitated out and it will leave the spray chamber saturated at the lower temperature.

It will also be apparent that where both the room atmosphere is recirculated through the conditioner and an amount of outside air is drawn into the same that the amount of heat required to saturate the air at the controlled temperature can be varied by regulation of the proportions of outside and inside air since the regulation of such proportions will vary the temperatures of the air drawn through the conditioner and consequently the heating required to secure saturation at the desired temperature.

It is also apparent that the relative humidity of the room can be maintained by the regulation of the degree to which the saturated air is heated after leaving the spray chambers within the limits of comfort to the workmen in the room. Thus by raising the temperature in the room, the relative humidity in the room will be lowered.

In its general organization, this invention comprises a thermostat which regulates the degree to which the saturated air is heated after leaving the spray chamber and a hygrostat which regulates the heat of the spray water, and the relative ingress of fresh and room air into the conditioner and also pilots the thermostat so that at temperatures above that for which the thermostat is set the heating of the air leaving the spray chamber and before being discharged into the room is controlled by the hygrostat to maintain a definite relative humidity under all conditions. All of these elements, together with the compressor for furnishing the pressure for the operation of the same are mounted on the conditioner so as to form a unitary structure, and means are also provided for drawing a current of room air past the sensitive parts of the hygrostat and the thermostat so as to insure their rapid response to variations in room conditions.

Figure 1:
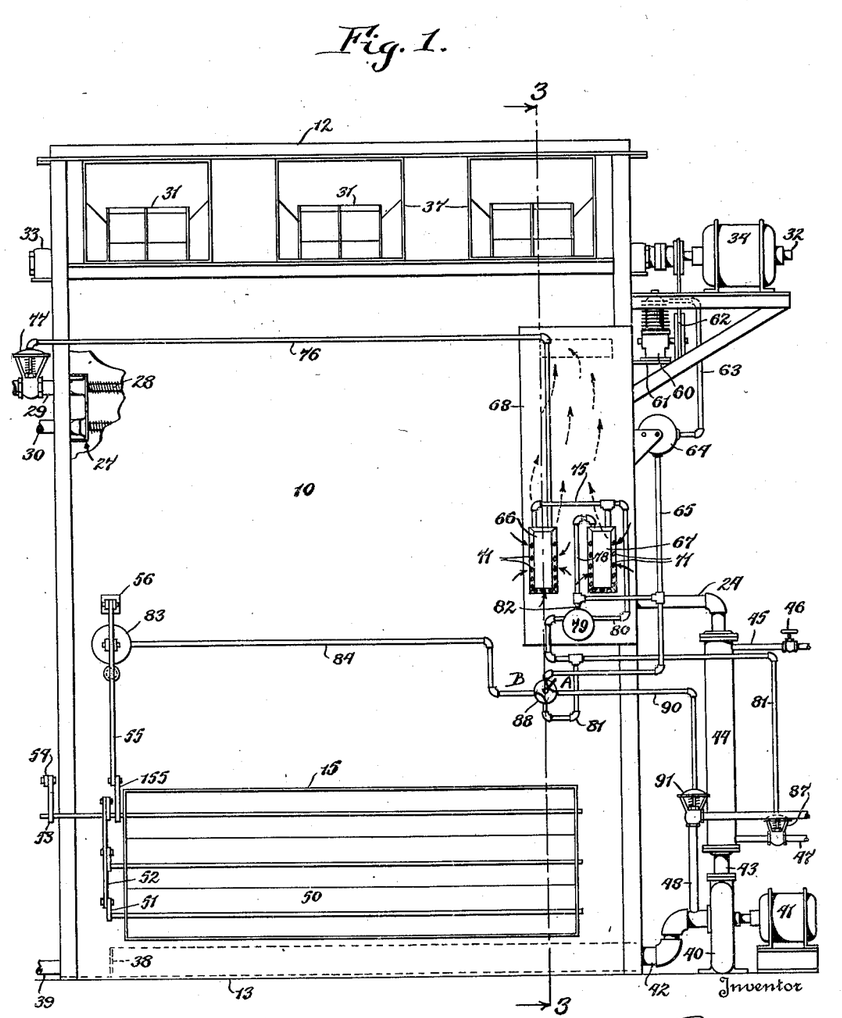
Figure 1 is a side view of an air conditioner embodying my invention.
Figure 2:
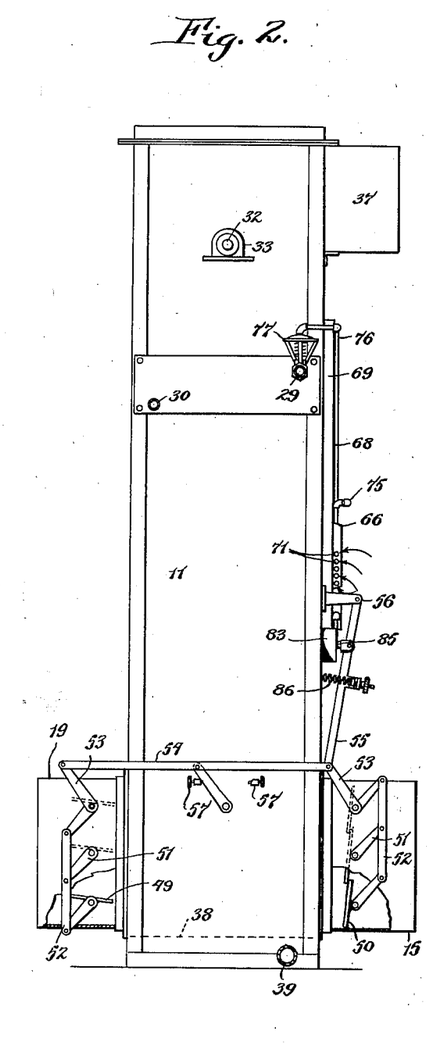
Figure 2 is an end view thereof.
Figure 3:
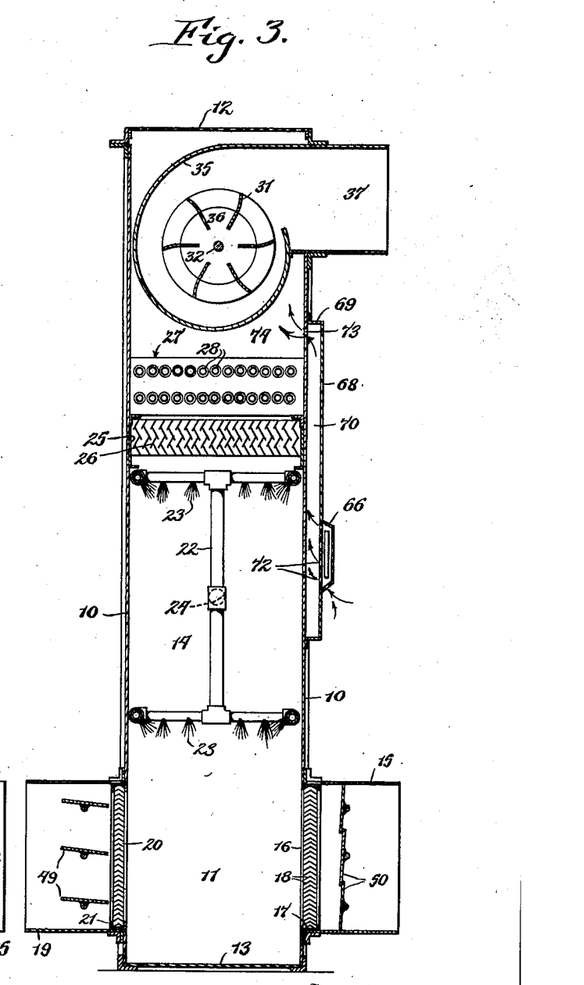
Figure 3 is a vertical transverse section, taken on line 3—3, Fig. 1.

An air conditioner suitable for use in conjunction with my present invention is shown in Figs. 1-3 of the drawings, but it will be understood that the conditioner shown is purely as an example and that the control apparatus forming the subject matter of this invention can be practiced with any conditioner functioning in the same general manner. As there shown the conditioner is constructed as follows:

The form of air conditioner is a three fan unit and is enclosed within a sheet metal casing or housing composed of side walls 10, end walls, 11, a top 12 and a bottom forming a pan 13 in which the excess spray water from the spray chamber 14 and water condensed out of the air is collected for recirculation through the sprays.

Air from the room is drawn into the spray chamber 14 through an inlet conduit 15 and through an inlet 16 in the lower end of the side wall 10. For the purpose of preventing the water in the spray chamber from passing out through the inlet 16, a removable frame 17 is arranged in the inlet and carries a plurality of louvers 18. These louvers are suitably formed so as not to appreciably interfere with the free flow of air into the conditioner but entirely prevent water from being splashed out of the spray chamber.

Fresh air from the outside is drawn into the conditioner through an air inlet conduit 19, and through an inlet 20 in the lower end of the side wall 10 opposite the inlet 16. This inlet is covered by a removable louver frame 21 similar to the louver frame 17 arranged over the room air inlet 16 and prevents water from splashing out through the fresh air inlet.

Within the spray chamber 14 is arranged the spray pipe system 22 which may be of any suitable construction and as shown is constructed to direct two banks of sprays 23 of finely divided particles of water directed against the upward air flow through the spray chamber. Spray water is forced into this pipe system 22 through a spray water inlet pipe 24 which extends out through one end wall 11 of the casing as shown in Fig. 1.

Above the spray chamber 14 is arranged a moisture eliminator composed of a removable horizontal frame 25 which carries a plurality of horizontal louvers 26 which louvers extend lengthwise of the casing. As shown in Fig. 3, each of these louvers is of zig-zag form in cross section and as the moisture laden air from the spray chamber is drawn between these louvers, it is whipped back and forth and any entrained water is thrown against the sides of the louvers from which it drips back into the spray chamber.

The heater 27 which raises the temperature of the saturated air leaving the eliminator to the desired degree to maintain the desired temperature condition in the room is arranged above the eliminator. Any suitable form of heater can be employed, that shown in Fig. 3 comprising a series of hairpin pipes 28 suitably connected with headers at one end of the casing. Steam for this heater is supplied through a steam inlet pipe 29 and passes out through an outlet pipe 30, both of which pass through one end of the casing. The hairpin pipes are preferably covered with fins and are staggered so as to cause the air to traverse a circuitous path with the maximum exchange of heat.

The air is drawn through the inlet conduits, spray chamber, eliminator, heater and discharged from the conditioner by one or more fans, three being shown, these fans 31 being mounted on a common shaft 32 suitably journaled in the upper part of the casing in ball bearings 33. This shaft is rotated by a motor 34 which is arranged externally of the casing. The fans 31 may be of any suitable construction and each is arranged within a fan housing 35, these housings being supported within the conditioner casing in any suitable manner. Each of the fan housings is provided at opposite sides around the shaft 32 with inlets 36 through which the air, after passing through the heater 27, is drawn into the fan housing. Air from the fan housings is discharged through outlets 37 which are arranged to suit the requirements of the building being conditioned.

A maximum level of water in the pan 13 at the bottom of the conditioner is maintained by an overflow weir 38, the excess water passing out through an outlet pipe 39 and any suitable float valve and water supply pipe (not shown) can be employed for maintaining a minimum level therein.

The spray water for saturating the air in the spray chamber is recirculated through the system by a centrifugal pump 40 driven by an electric motor 41. A suction pipe 42 connects this pump with the lower part or pan 13 of the conditioner housing so that the water collected in this pan is withdrawn by the pump and the outlet 43 of the pump connects with a steam heater 44 through which the spray water is forced into the inlet pipe 24 to the spray system and thence into the spray chamber in the form of finely divided sprays as described.

This spray water heater 44 is preferably of the instantaneous type in which the water flows through parallel pipes located within an outer shell and into which outer shell and outside the pipes steam is admitted through a steam inlet pipe 45. In this pipe is located a suitable hand valve 46 for turning off the steam supply. The condensed steam from the heater passes out through an outlet pipe 47 at its lower end.

For cooling the spray water, a cold or refrigerated water supply pipe 48 connects with the suction of the pump in any suitable manner and introduces refrigerated or cold water into the spray system.

The relative amounts of fresh and room air admitted to the conditioner is controlled by a plurality of dampers 49 in the fresh air inlet conduit 19 and a plurality of dampers 50 in the room air inlet 15. The dampers of each set are mounted to swing about horizontal axes and on the shaft of each damper an arm 51 is mounted, the arms of each set being connected together by a tie bar 52 thus causing all of the louvers of each set to move into open, closed or intermediate positions in unison.

To the upper damper shaft of each set of louvers is connected an arm 53 and these arms 53 are connected by a cross bar 54 so that the fresh air and room air dampers are compelled to move together. These parts are so arranged that when the room air dampers 50 are traveling from open toward closed positions, the fresh air dampers 49 are moving in the opposite direction or from closed toward open position. Thus when the room air dampers 50 are closed, the fresh air dampers 49 are open and vice versa, and when the dampers are in their intermediate position of travel, air is drawn into the unit from both sources, viz. fresh air from the outside and return recirculated air from the inside. The damper mechanism is operated by a lever 55 which is pivotally connected to an arm 155 which is secured to the shaft of the uppermost louver 50 and at its upper end this lever 55 is pivotally connected to a bracket 56, there being sufficient play in the connections to insure proper operation of the lever.

Adjustable stops such as 57 are usually provided for limiting the travel of the damper operating mechanism in the direction toward closing of the fresh air dampers 49 and opening the return air dampers 50 so that a minimum of from 10 to 15 per cent of the air handled by the conditioner will be drawn from our doors as fresh air even when dampers 50 and 49 are nominally closed and open, respectively. It will be understood that any arrangement for controlling the proportionate amounts of return and fresh air can be used in connection with my invention, and that the specific arrangement is by way of example only.

The hygrostat pilot control system forming the subject matter of the present invention in the embodiment shown in Figs. 1-4, is constructed as follows, it being understood that the specific instruments employed form no part of the present invention, the present invention being directed wholly to the combination of these instruments in a control system as described and claimed. It is also to be understood that the pressures and other conditions to which these instruments respond are by way of example only and that other ranges of pressures can be employed to meet different conditions without departing from the invention.

The numeral 60 represents an air compressor for furnishing air at a constant gage pressure of 15 pounds per square inch for motivating the entire control equipment. This compressor is carried on a suitable bracket 61 on the conditioner casing and is driven from the fan shaft 32 by a belt drive 62 or in any other suitable manner. The air compressor 60 is connected by a line 63 with a storage tank 64 and this storage tank supplies the main feed line 65 under constant gage pressure of 15 pounds per square inch.

The control of the conditioner is initially effected through a thermostat 66 and a hygrostat 67 both of which are mounted on a hollow sheet metal instrument board 68. This instrument panel or board is provided with a rim 69 at its edges which rim is securely fastened to the side of the conditioner, so as to form an air tight chamber 70 between the panel or board and the front wall of the conditioner, as shown in Fig. 3. This panel or board, as best shown in Fig. 3 extends upwardly past and outside of the spray chamber 14, the eliminator, 26, heater 27 and the fan inlet chamber above the heater. Ports 71 are provided in the outer covers of the hygrostat 67 and the thermostat 66 and there are also ports 72 in the panel or board immediately in rear of these instruments providing a passage from the outer atmosphere, through the ports 71 in the instrument covers, past the sensitive parts of the instruments and through the ports 72 to the chamber 70 formed by the instrument panel. Ports 73 are also provided in the front casing wall 10 between the fan inlet chamber 74 and the chamber 70 formed by the instrument board. It will, therefore, be apparent that due to the suction created by the fans 31 in the fan inlet chamber 74, a small amount of room air under room conditions of temperature and humidity will be drawn through the ports 71 in the covers of the instruments 66 and 67, past their sensitive parts, through ports 72 into the chamber 70 and through ports 73, into the fan inlet chamber 74. By this means a current of air is drawn at high velocity over the sensitive actuating parts of the thermostat 66 and hygrostat 67 greatly accelerating their action as compared with such action in still air.

The thermostat 66 is of the direct acting intermediate position type which throttles the air delivered to it through the hygrostat outlet line 75 in such manner as to gradually and proportionately increase the air pressure in its outlet line 76 as the temperature of the room air passing its sensitive parts increases. When the temperature of the air in the room is above that for which the thermostat is set, the air pressure in the thermostat outlet line 76 will have approached a pressure equal to that maintained in the hygrostat outlet line 75. The reverse also occurs viz: when the temperature of the air surrounding the thermostat is lower than that for which the thermostat is set, the air pressure in the thermostat outlet line 76 will have fallen and approached 0 pounds gage pressure.

The thermostat outlet line 76 controlled by the thermostat in the manner just described, connects with a direct acting diaphragm valve 77 which controls the admission of steam or other heating medium to the heater 27 which raises the temperature of the saturated air leaving the spray chamber before it is discharged into the room. As the pressure in the thermostat outlet line 76 rises, the diaphragm valve gradually closes, progressively cutting off steam to the heater 27, until the air pressure in the thermostat outlet line 76 has reached about 8 pounds. At a pressure above 8 pounds in the thermostat outlet line 76, the diaphragm valve 77 remains closed and no steam is supplied to the heater. The reverse also occurs, viz: as the pressure in the thermostat outlet line 76 falls below 8 pounds pressure, the diaphragm valve 77 gradually opens, admitting steam to the heater until it is wide open when the pressure in the thermostat outlet line 76 approaches or falls to 0 pounds gage pressure.

The hygrostat 67 is of the type known as an intermediate position, reverse acting hygrostat which is supplied with air at 15 pounds gage pressure through a branch line 78 of the main feed line 65. This hygrostat throttles the air supplied to it by the 15 pound pressure line 78 in such manner as to gradually and proportionally increase the air pressure from 0 pounds in its outlet line 75 as the relative humidity of the room air drawn past its sensitive parts decreases. When the relative humidity of the air is below that for which the hygrostat is set, the air pressure in the hygrostat outlet line 75 will have approached the higher or 15 pound gage pressure. The reverse also occurs, viz: when the relative humidity of the air surrounding the hygrostat is higher than that for which the instrument is set, the air pressure in its outlet line 75 will have fallen and approached 0 pounds gage pressure.

The numeral 79 represents a delayed gradual direct acting relay which is connected on its inlet side to the hygrostat 67 by means of a line 80 which connects with the outlet line 75 of the hygrostat. This relay 79 controls the pressure in its outlet line 81 and is so designed that at pressures from 0–6 pounds in the hygrostat outlet lines 75 and 80, the pressure in the relay outlet line 81 remains at zero and as the pressure in the hygrostat outlet lines 75 and 80 rises from 6 pounds to 12 pounds gage pressure, the pressure in the relay outlet line 81 rises proportionately from 0 pounds to 12 pounds gage pressure. This relay is also supplied with air under pressure from the main 15 pounds pressure feed line 65 through a branch line 82, thus amplifying the quantity of air for maintaining the required air pressure in the relay outlet line 81 without depleting the air supplied through the hygrostat 67 and its outlet lines 75 and 80. This amplification of the amount of air furnished through the relay 79 is an important part of its function as considerable more volume of air is required through the relay outlet line 81 in a short time interval than could be furnished through the hygrostat. Any suitable form of relay functioning as described can be employed, one suitable for use in connection with the present invention being shown and described in the application for patent of Snedicker, Ser. No. 314,922, and assigned to the Powers Instrument Company of Chicago, Illinois.

The numeral 83 represents a diaphragm damper motor which is actuated through pressure derived from its pressure inlet line 84, this motor controlling the position of the damper mechanism and hence controlling the proportional amounts of fresh and recirculated room air which is drawn through the conditioner as described. This diaphragm motor 83 has a rod 85 which connects with the upper end of the damper actuating lever 55 and is so constructed that a rising air pressure supplied through its inlet line 84 moves the rod 85 and the upper end of the damper operating lever 55 outwardly against the tension of its adjustable return spring 86, this rising pressure in the line 84 thereby effecting an opening movement of the dampers 50 controlling the room air inlet conduit 15 and a closing movement of the dampers 49 controlling the admission of fresh air from the outside. These elements are so designed that the wide open and shut positions of the room air dampers 50 and the fresh air dampers 49 will have been accomplished when the air pressure in the diaphragm motor inlet line 84 reaches approximately 8 pounds pressure, and the dampers remain in this position under any higher pressures in the line 84. The opposite also occurs, viz: as the air pressure in the motor inlet line 84 falls below the assumed 8 pounds pressure, the return spring 86 will begin to close the room air dampers 50 and open the fresh air dampers 49 until the dampers 50 and 49 are closed and open respectively as the air pressure in the line 84 reaches or approaches 0 gage pressure.

The numeral 87 represents a reverse acting diaphragm valve which controls the admission of steam to the spray water heater 44 for heating the spray water and providing for the saturation of the air with a greater amount of water. This reverse acting diaphragm valve remains closed under spring tension until the air pressure in the relay outlet line 81 with which it is connected rises to above 8 pounds gage pressure and then this diaphragm valve gradually opens and becomes fully open when the pressure in line 81 has risen to or approaches 15 pounds gage pressure.

The reverse also occurs, viz: from the wide open position of the diaphragm valve 87 at or near 15 pounds pressure in the relay outlet line 81, the diaphragm valve slowly closes with dropping air pressure in the line 81 until it is entirely closed when the air pressure has fallen at or near 8 pounds.

The numeral 88 represents a four-way cock which is operated by a hand lever 89 and is so designed and connected to the pressure lines that when the hand lever 89 is moved to the A position, the main 15 pound pressure feed line 65 is connected to the line 84 which controls the diaphragm damper motor 83 and this pressure thereby holds the room air dampers 50 in their extreme open positions, and the fresh air inlet dampers 49 in their fully closed positions. At the same time the four-way valve 88 in this position connects the relay outlet line 81 with a line 90 which controls a diaphragm valve 91. This valve controls the admission of cold or refrigerated water into the spray water system through the cold water pipe connected with the spray water pump suction, and is designed to gradually close under increasing pressure in its inlet pipe 90. When the lever 89 of the four-way valve 88 is thrown to the B position, the damper motor is connected to the relay outlet line 81 thereby placing the dampers under control of the hygrostat 67 and at the same time, the cold water diaphragm valve line 90 is connected with the main pressure feed line 65 and the diaphragm valve 91 controlling the admission of refrigerated water to the spray water is thereby under 15 pounds pressure and held closed.

The port in the thermostat 66 which controls the pressure in the thermostat outlet line 76 is always wide open when the temperature of the room is above the temperature at which the thermostat is set to maintain, and since it is piloted by air supplied through the hygrostat 67, it cannot close the direct acting diaphragm valve and cut off the steam to the air heater unless it is supplied with air from the hygrostat 67.

Thus if the air in the hygrostat outlet line 75 is at a pressure too low to close the air heater diaphragm valve 77, steam will feed into the heater 27 and further raise the temperature of the air leaving the unit, and raise the room temperature to a point well above that which the thermostat 66 is set to maintain. On the other hand, the thermostat 66, regardless of the air pressure in the hygrostat outlet line 75, always will lower the air pressure in its outlet line 76 and open the air heater diaphragm valve 77 if the room temperature drops below that at which the thermostat 66 is set to maintain. Thus the room temperature is always under control of the thermostat to prevent its temperature from falling below the temperature at which the thermostat is set to maintain. However, at a temperature above that which the thermostat is set to maintain, the room temperature is entirely under control of the hygrostat.

With the above organization of the parts, as shown in Figs. 1–4, the conditioner is adapted for use as a dehumidifier, its operation being as follows:

Operation as Dehumidifier

Dehumidifying in summer

When the air conditioner is operating as a cooling or dehumidifying agent in the summer season or when the outside wet bulb is above the necessary dew point for the desired inside dew point, or room temperature, and required relative humidity, the handle of the four-way cock 88 is set at the A position, thus connecting the damper motor inlet line 84 with the 15 pound air pressure feed line 65 and thereby actuating the damper mechanism to close the outside air dampers 49 and open the return room air dampers 50 to recirculate the room air. In this position of the valve the cold water supply valve 91 is also placed under control of the hygrostat 67 and relay 79 by the connection of the relay outlet line 81 with the cold water valve line 90.

The steam supply for raising the temperature of the spray water will be cut off by the hand valve 46 in the summer and consequently the action of the diaphragm steam valve 87 controlling the passage of steam through the spray water heater 44 will be nullified.

*First example: Too high a temperature and too high a relative humidity.*—Assuming that the room temperature is above the temperature at which the thermostat 66 is set to maintain, the thermostat will, if sufficient air pressure is available in the hygrostat outlet line 75, allow this air to pass into the thermostat outlet line 76 and hold the diaphragm steam valve 77 closed thereby cutting off the steam to the saturated air heater 27. Assuming also that the hygrostat 67 is set to maintain a given relative humidity and that the relative humidity is rising above this setting, the hygrostat will lower the pressure on its outlet line 75 and since the relay 79 acts to reduce the pressure more rapidly in its outlet pipe 81 than the reduction in the hygrostat outlet pipe 80 controlling the relay, the cold water diaphragm valve 91 will open and allow cold or refrigerated water to feed in the suction of the pump 40, this cold water cooling the spray water and lowering the temperature and dew point or amount of water in the air leaving the spray chamber, and therefore if the temperature of the room remains unchanged, the relative humidity will fall. Assuming, however, that the relative humidity of the room is still above the hygrostat setting, with the cold water valve 91 for the spray water system wide open and feeding the full amount of cold water available, then the air pressure in the hygrostat outlet line 75 will fall still lower until there is insufficient air pressure supplied to the thermostat 66 to hold the air heater diaphragm steam valve 77 closed, then steam will feed into the heater 27 and raise the temperture of the air leaving the conditioner until the room temperature has risen sufficiently to lower the relative humidity the required amount under minimum dew point obtainable with the cold water available.

Since in the processing of various materials in the course of manufacture, it is extremely important to maintain the correct relative humidity almost regardless of temperature, within the limits of human comfort this pilot control of relative humidity accomplishes the maintenance of the proper relative humidity by raising the room temperature above that for which the tremostat is set to maintain.

*Second Example: Too low a temperature and too low a relative humidity.*—Assuming a falling room temperature and too low a relative humidity in the room, as the relative humidity falls, the air pressure in the hygrostat outlet line 75 rises, causing the rising pressure in the thermostat outlet line 76 and thereby causing a closing of the diaphragm valve 77 controlling the admission of steam to the air heater 27. This action continues until the room temperature has reached the point for which the thermostat is set when the thermostat 66 will throttle the air from the hygrostat outlet line 75 to the thermostat outlet line 76 and if the lowering room temperature continues, will reduce the pressure in the thermostat outlet line 76 the required amount to open the diaphragm steam valve 77 and cause the correct amount of steam to enter the air heater 27, and hold the room temperature from falling below that for which the thermostat is set, and it does this even though the hygrostat 67 with falling relative humidity is raising the pressure in its outlet line 75 and would hold the diaphragm steam valve 77 closed were it not for the throttling action of the thermostat. As the hygrostat continues to raise the air pressure in its outlet lines 75 and 80 with falling relative humidity, through the delayed acting relay 79 the air pressure in the relay outlet line 81 rises more rapidly thereby closing the cold water valve 91 and cutting off the cold water supply to the spray system and allowing the spray water to rise in temperature to that of the wet bulb temperature of the return air from the room, thus raising the saturated temperature and dew point of the air leaving the conditioner. With the cold water supply cut off the conditioner tends to increase the relative humidity of the air recirculated through the conditioner at the constant minimum controlled temperature of the room since the air leaves the spray chamber saturated at room temperature, and if left long enough in this condition of operation, the air in the room would eventually have 100% relative humidity or be completely saturated. However, as soon as the relative humidity rises to the percent for which the hygrostat is set, the hygrostat throttles the air pressure in its outlet lines 75 and 80 and the falling pressure in these lines through the medium of the relay 79 causes the cold water valve 91 to open and hold the relative humidity of the room at the setting of the hygrostat.

*Third Example: A low temperature and too high a relative humidity.*—This condition occurred or was occuring toward the last stage of the second example, and it was shown that under low temperature the thermostat 66 by throttling of the pressure to its outlet pipe 76 prevents the temperature from dropping below its set minimum and the hygrostat 67 with too high a relative humidity in the room will throttle the pressure in its outlet lines 75 and 80 and through the relay 79 will reduce the pressure in the relay outlet line 81 thereby opening the cold water valve 91, admitting cold water to the spray system and lowering the temperature of the spray water and effecting a resultant lower dew point of the air leaving the conditioner. By supplying air containing less moisture, the relative humidity in the room will drop until it reaches the setting of the hygrostat.

*Fourth Example: High temperature and low relative humidity.*—This condition is very likely to occur in actual practice, especially if the unit has been out of service for some time. Immediately on starting, the hygrostat 67, if the relative humidity of the room is low enough, will carry a high pressure (12 or 15 pounds) in its outlet line 75, and since the temperature is high, the thermostat 66 allows the hygrostat 67 to control the pressure in the thermostat outlet line 76 and keep the air heater steam valve 77 closed. At the same time since the pressure in the line 80, through the relay 79, in the relay outlet line 81 and line 90 is high, the cold water valve 91 remains closed and the same action takes place as in the latter part of the second example, viz: the recirculated water will assume room wet bulb temperature and raise the relative humidity in the room until the setting of the hygrostat is reached.

It has, of course, been assumed that a sufficient quantity of air has been supplied to the room by the unit to absorb the heat generated within or delivered into the room, so that the air delivered to the room would not be raised by the heat to a temperature above the dry bulb temperature which would give the maximum relative humidity required.

It has been shown that under all four possible combinations between high and low temperature and high and low relative humidity, as outlined in examples one through four, the hygrostat pilot control of temperature and relative humidity embodied in the present invention, will always, on coming into action correct the relative humidity to that for which it is adjusted and in doing so it carries any desired minimum room temperature and automatically maintains a higher than minimum room temperature if required to sustain the correct relative humidity, such a condition occurring when there is a scarcity of refrigerated water on hot days, or when an excessive amount of heat filters into the room from a higher outside temperature due to a hot sun.

*Dehumidifying in winter*

During the winter season or when the outside wet bulb temperature is below the dew point required for the desired relative humidity and minimum temperature inside, the handle of the four-way cock 88 is set at its B position, thus placing the damper motor 83 under control of the hygrostat 67 by connecting the relay outlet line 81 and the damper motor line 84 and at the same time closing the cold water supply valve 91 by connecting its line 90 with the main 15 pounds pressure feed line 65.

With this organization of the parts, the control operates in all four examples previously given in exactly the same manner as in the summer season except that the colder air is drawn in from the outside under control of the diaphragm motor 83 for cooling instead of using cold or refrigerated water. It will be understood that by admitting or increasing cold air from the outside by opening the fresh air dampers 49 through the medium of the hygrostat 67 and the diaphragm motor 83 that the saturated temperature of the air leaving the spray chamber will be lowered in the same manner as if cold water were introduced into the suction of the spray water pump by opening the valve 91.

During the winter operation of the conditioner, the hand valve 46 is opened thereby placing the steam heater 27 for the spray water in operation under control of the diaphragm valve 87 through the hygrostat 67 and relay 79. This valve when opened admits steam to the heater 44 and heats the spray water when required to raise the dew point and relative humidity the required amount.

The diaphragm valve 87 does not open and allow steam to enter the spray water heater except as a last resort, however, namely after the fresh air dampers 49 and the return air dampers 50 have been fully closed and opened, respectively. Under such conditions the recirculating air in the room could be raised to the desired humidity without heating the spray water were it not for the provision of the stop 57 which prevents the fresh air dampers 49 from closing completely and hence heat may be required to raise the temperature at which the saturated air leaves the spray chamber to the desired degree.

OPERATION AS HUMIDIFIER

Figures 4, 5:
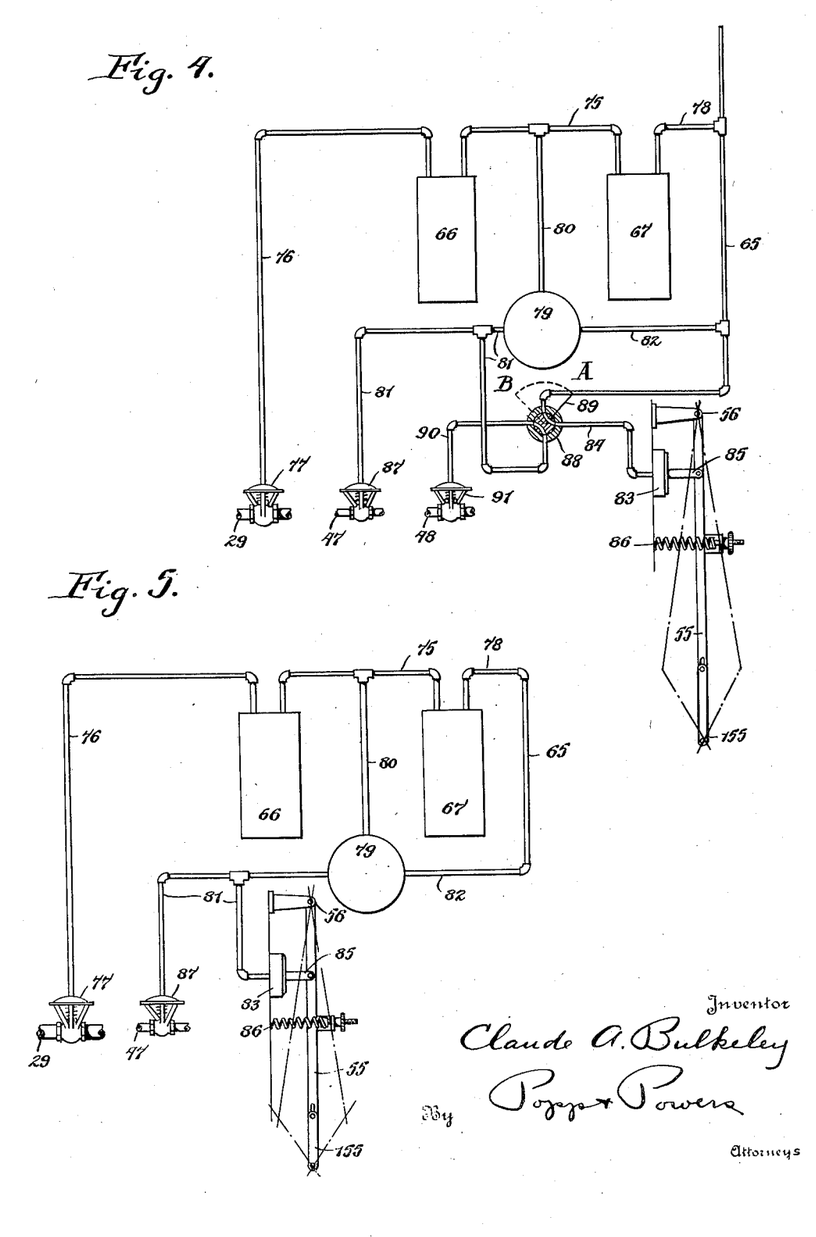
Figure 4 is a schematic representation of the control apparatus, shown in Figs. 1-3.
Figure 5 shows a modified form of control apparatus suitable for use when the apparatus is used as a humidifying agent.

When the conditioner is used as a humidifying agent, its arrangement is preferably modified, this modified arrangement being shown in Fig. 5 and being as follows:

The entire unit is constructed in exact duplicate as heretofore described in connection with its use as a dehumidifying or cooling agent except that there is no cold or refrigerated water supply to the spray pump suction with its associated valve and control line (the cold water supply pipe 48, diaphragm valve 91 and its control line 90, in the heretofore given layout) and there is no four-way cock 88 to alternately place the dampers and the cold water supply valve under control of the hygrostat. The relay outlet line 81 is instead directly and permanently connected with the damper control motor 83. This arrangement is therefore identical for all seasons of the year as that used during the winter season, when the unit is operated as a dehumidifying agent.

*Humidifying in summer*

When the conditioner is operating as a humidifying agent in the summer season, the tension on the spring 86 which acts in opposition to the damper control motor 83 is increased so that the damper control motor 83 entirely opens the fresh air dampers 49 and closes the recirculation dampers 50 when the air pressure in the relay outlet line 81 falls to 8 pounds pressure. In summer operation, the steam line 45 to the spray water heater 44 will be closed by means of the hand valve 46, and hence the diaphragm valve 87 will be rendered inoperative so far as raising the temperature of the spray water is concerned.

*First Example: Too high a temperature and too high a relative humidity.*—When the room temperature is above that at which the thermostat 66 is set, the thermostat, if air pressure is available in the hygrostat outlet line 75, allows this pressure to pass to the thermostat outlet line 76 and hold the diaphragm valve 77 closed and thereby prevent steam from entering the saturated air heater 27. Also with the humidity rising above the setting of the hygrostat 67, the hygrostat throttles the pressure in its outlet line 75 and since the relay 79 controlled by this line causes the pressure in its outlet line 81 to fall more rapidly than the pressure in the hygrostat outlet lines 75 and 80, the falling pressure in the relay outlet line 81 and in the damper control motor 83 allows the tension spring 86 to open the fresh air damper 49 and admit outside air and proportionally close the return air dampers 50 and reduce the amount of air recirculated through the conditioner from the room.

When the pressure in the relay outlet line 81 has dropped to about 8 pounds pressure, the fresh air dampers 49 and the return air dampers 50 will be wide open and closed, respectively, thereby supplying the conditioner with fresh air only. Under this condition, with recirculated spray water, the air will leave the spray chamber at or within 1° F. of saturation at the wet bulb temperature of the outside air drawn into the conditioner. Should the relative humidity still continue to rise with the air being delivered into the room saturated at or near the fresh air wet bulb temperature, as the pressure in the hygrostat outlet line 75 and through the thermostat 66 to its outlet line 76 continues to fall and approaches 8 pounds pressure, the diaphragm valve 77 begins to open and allow steam to enter the air heater 27. As the temperature of the air handled through the unit is raised on passing this heater, the room temperature rises and a lower relative humidity results. This rise in temperature continues until the relative humidity falls to that for which the hygrostat is set to maintain. By this means, if the relative humidity is too high with air passing the unit saturated at or near the outside wet bulb temperature, the hygrostat 67 maintains a room temperature sufficient to lower the relative humidity even though the room temperature is higher than that for which the thermostat 66 is set to maintain.

*Second Example: Too low a temperature and too low a relative humidity.*—Too low a humidity results in a high air pressure in the hygrostat outlet line 75, and to the thermostat. As soon as the temperature falls to the minimum for which the thermostat is set, the thermostat throttles the air in its outlet line 76, thereby causing the diaphragm valve 77 to open and admit steam to the air heater 27. By this means the temperature of the room is prevented from falling below the minimum for which the thermostat is set.

If with this minimum room temperature, the relative humidity is still falling or too low, the resultant rising pressure in the hygrostat outlet lines 75 and 80 to the relay 79 will cause a more rapid rising pressure in the relay outlet line 81 to the damper motor 83 and will cause the damper motor to begin to close the fresh air dampers 49 and open the return air dampers 50. By recirculating air from the room in part or in whole, the average wet bulb temperature of the air entering the conditioner will rise, thereby causing a higher saturated temperature of the spray chamber and causing the air leaving the spray chamber and causing the relative humidity in the room to rise to the point at which the hygrostat is set to maintain.

*Third Example: A low temperature and too high a relative humidity.*—As pointed out previously, the action of the thermostat 66 never allows the room temperature to fall lower than that for which the thermostat is set to maintain. This minimum temperature being established and maintained and with a rising or too high a relative humidity, the pressure in the hygrostat outlet line 75, and through the relay 79, in the relay outlet line 81 will fall first opening the fresh air dampers 49 wide and closing the return air dampers 50. If the relative humidity is still too high, the continued falling pressure in the hygrostat outlet line 75, through the thermostat 66 and its outlet line 76 will open the steam valve and admit steam to the heater 27 which raises the room temperature the amount necessary to lower the relative humidity to that for which the hygrostat is set to maintain. By this hygrostat pilot control it is apparent that since the relative humidity can be maintained by maintaining a temperature higher than the thermostat setting, that the relative humidity will be maintained notwithstanding a varying and uncontrolled outside wet bulb temperature which may be too high for an established minimum temperature and relative humidity.

*Fourth Example: High temperature and low relative humidity.*—This condition is very likely to occur in practice especially if the conditioner has been out of service for a time. Immediately on starting, the hygrostat 67, since the relative humidity is low, will carry a high pressure (12 to 15 pounds) in its outlet line 75, and since the temperature is high, the thermostat 66 allows the pressure from the hygrostat outlet line 75 to keep the steam valve 77 closed and prevent steam from entering the heater 27 and affecting the temperature of the room. With this high pressure in the hygrostat outlet lines 75 and 80 the relay 79 will maintain a corresponding pressure in its outlet line 81 which if high enough will cause the damper motor 83 to hold the return air dampers 50 open and the fresh air dampers 49 closed, which, as previously pointed out, will always result in a constantly rising saturated temperature and dew point of the air leaving the spray chamber until the room air becomes at or nearly saturated. Before such saturation occurs, however, the rising relative humidity in the room effects a corresponding drop in pressure in the hygrostat outlet lines 75 and 80 with a still more rapid drop in the relay outlet line 81, and this drop causes the fresh air dampers 49 to open and the return air dampers 50 to close. This admits fresh air and establishes a dew point of the air leaving the conditioner at a temperature approximately equal to that of the outside wet bulb.

It has been shown in Examples one to four, that acting as a humidifying agent, under all possible conditions of high and low temperature and high and low relative humidity, the hygrostat pilot control maintains the lowest possible temperature allowable with the available outside wet bulb temperature, and always maintains the relative humidity for which the hygrostat is set, and while so functioning will cause the room temperature to keep in step and fall with the outside wet bulb temperature until a desired minimum room temperature is reached, at which time the control will maintain this minimum room temperature and also maintain the correct minimum dew point necessary to give the correct relative humidity regardless of how low the outside wet bulb temperature may fall.

*Humidifying in winter*

When the conditioner is operating in the winter season or whenever the outside wet bulb temperature is below the dew point necessary to maintain the correct relative humidity at minimum room temperature, the tension of the damper spring 86 acting in opposition to the damper motor 83 is adjusted so that the fresh air dampers 49 and the return air dampers 50 are closed and open, respectively, when pressure in the relay outlet line 81 has risen to approximately 8 pounds. The hand valve 46 in the steam line 45 supplying steam to the spray water heater 44 is also opened. The control equipment is therefore connected up and functions exactly the same as when it is used as a dehumidifying agent during the winter season as described under this caption.

As a whole the hygrostat pilot control embodying the present invention provides a very simple, inexpensive, and reliable control which accurately maintains any set relative humidity under all conditions of operation and also maintains a minimum temperature and tends to maintain a definite temperature. It, furthermore accomplishes this control with a minimum expenditure of steam and refrigerating medium and will function to maintain the correct relative humidity regardless of the failure of either of these. The control equipment is also compact and accessible and is carried in its entirety by the conditioner, thereby providing a complete unitary structure.

I claim as my invention:
1. A control for an air conditioner having a spray chamber through which the air to be conditioned is passed and a heater for heat- ing the air leaving the spray chamber, comprising a thermostat responsive to room conditions and controlling said heater at room temperature at or below the temperature for which it is set and normally operating to maintain the set temperature in the room and a hygrostat responsive to the room conditions and controlling the temperature of the saturated air leaving the spray chamber and to maintain a set relative humidity in the room, and said hygrostat being also operatively connected to and controlling said heater at temperatures above which said thermostat is set to maintain the set relative humidity above said set temperature through the addition of heat to the saturated air leaving the spray chamber.

2. A control for an air conditioner having a spray chamber through which the air to be conditioned is passed and a heater for heating the air leaving the spray chamber, comprising regulating means for said heater, a thermostat operatively connected with said regulating means and maintaining a predetermined minimum temperature in the room to be conditioned, means for controlling the amount of water vapor added to the air passing through said spray chamber and a hygrostat operatively connected with said controlling means and maintaining a predetermined relative humidity in said room, said hygrostat being also operatively connected to said regulating means and controlling said heater at room temperatures above said predetermined minimum to maintain said predetermined relative humidity above said minimum temperature through the addition of heat to the air leaving the spray chamber.

3. A control for an air conditioner having a spray chamber through which the air to be conditioned is passed and a heater for heating the air leaving the spray chamber, comprising a thermostat responsive to room conditions and controlling said heater at room temperatures at or below the temperature for which it is set and a hygrostat responsive to room conditions and normally controlling the temperature of the saturated air leaving the spray chamber to maintain a set relative humidity and said hygrostat being also operatively connected with said thermostat, said hygrostat controlling said heater through said thermostat at room temperatures above that for which the thermostat is set to maintain said set relative humidity above said set room temperature through the addition of heat to the air leaving the spray chamber.

4. A control for an air conditioner having a spray chamber through which the air to be conditioned is passed and a heater for heating the air leaving the spray chamber, comprising a source of pressure, pressure actuated means controlling said heater, a hygrostat responsive to room conditions and connected with said source of pressure, a thermostat responsive to room conditions and receiving pressure from said hygrostat and actuating said pressure actuated heater controlling means, means actuated by said hygrostat for controlling the temperature of the saturated air leaving said spray chamber to maintain a predetermined relative humidity at temperatures at or below the temperatures for which said thermostat is set, said elements being so organized that at room temperatures at or below the temperature for which said thermostat is set, said heater is controlled by said thermostat and at higher temperatures, said heater is controlled by said hygrostat to maintain said predetermined relative humidity at room temperatures above that which said thermostat is set to maintain through the addition of heat to the saturated air leaving the spray chamber.

5. A control for an air conditioner having a spray chamber through which the air to be conditioned is passed and a heater for heating the air leaving said spray chamber, comprising a source of pressure, a hygrostat and a thermostat responsive to room conditions, a pressure actuated valve controlling the admission of a heating medium to said heater, a pressure feed line connecting said source of pressure and said hygrostat, a hygrostat outlet line connecting said hygrostat and thermostat and forming a source of pressure for said thermostat controlled by said hygrostat, and a thermostat outlet line connecting said thermostat and said valve, said elements being so organized that at room temperatures at or below that for which the thermostat is set said valve is controlled by said thermostat and at higher room temperatures said valve is controlled by said hygrostat.

6. A control for an air conditioner having a spray chamber through which the air to be conditioned is passed and a heater for heating the air leaving said spray chamber, comprising a source of pressure, a hygrostat responsive to room conditions, a pressure feed line between said source of pressure and said hygrostat, a thermostat responsive to room conditions, a hygrostat outlet line between said thermostat and said hygrostat and supplying pressure to said thermostat, a pressure outlet line for said thermostat, said thermostat permitting free communication between said hygrostat and said thermostat outlet line at room temperatures above which it is set to maintain, and throttling the pressure in said thermostat outlet line at room temperature below that which it is set to maintain, and a direct acting diaphragm valve connected with said thermostat outlet line and controlling the flow of heating medium to said heater, whereby at room temperatures below that at which the thermostat is set to maintain said thermostat throttles the pressure in its outlet line to open said valve and at room temperatures above that at which the thermostat is set to maintain, said valve is controlled by said hygrostat.

7. A control for an air conditioner having a spray chamber through which the air to be conditioned is passed and a heater for heating the air leaving said spray chamber, comprising a hygrostat responsive to room conditions and having a pressure supply and an outlet line, said hygrostat operating to throttle the pressure in its outlet line as the room relative humidity increases, a thermostat supplied with pressure from said hygrostat outlet line, a thermostat outlet line, said thermostat permitting free communication between said hygrostat outlet line and said thermostat outlet line at room temperatures above that which said thermostat is set to maintain and throttling the pressure in said thermostat outlet line at room temperatures below that which it is set to maintain, and a direct acting pressure actuated valve connected with said thermostat outlet line and controlling the flow of heating medium into said heater whereby at room temperatures below that at which the thermostat is set to maintain said thermostat throttles the pressure in its outlet line to open said valve and at room temperatures above that which the thermostat is set to maintain, said valve is controlled by said hygrostat.

8. A control for an air conditioner having a spray chamber through which the air to be conditioned is passed. comprising means for introducing a heating medium to raise the saturated temperature of the air leaving the spray chamber, a valve controlling said heating medium, a damper mechanism adapted to admit fresh and return air to said spray chamber in inverse proportions, a motor actuating said damper mechanism, a source of pressure, and a hygrostat in contact with the room air and responsive to room conditions and connected with said source of pressure, said hygrostat having an outlet line connected with said valve and said motor, said hygrostat varying the pressure in said outlet line to alternately open said valve and close said fresh air dampers and to close said valve and open said fresh air dampers.

9. A control for an air conditioner having a spray chamber through which the air to be conditioned is passed, comprising means for introducing a heating medium to raise the saturated temperature of the air leaving the spray chamber, a valve controlling said heating medium, a damper mechanism adapted to admit fresh and return air to said spray chamber in inverse proportions, a motor actuating said damper mechanism, a source of pressure, and a hygrostat in contact with the room air and responsive to room conditions and connected with said source of pressure, said hygrostat having an outlet line connected with said valve and said motor, said hygrostat varying the pressure in said outlet line to alternately open said valve and close said fresh air dampers and to close said valve and open said fresh air dampers, a tension spring associated with said damper mechanism and opposing the action of said motor and means for adjustably regulating the tension of said spring.

10. A control for an air conditioner having a spray chamber through which the air to be conditioned is passed, comprising means for heating the spray water, a pressure actuated valve controlling the spray water heating medium, means for cooling the spray water, a pressure actuated valve controlling the cooling medium, a damper mechanism adapted to admit fresh and return air to said spray chamber in inverse proportions, a motor actuating said damper mechanism, a source of pressure, a hygrostat in contact with the room air and responsive to room conditions connected with said source of pressure, a hygrostat outlet line connecting said hygrostat with said pressure actuated heating medium valve and a valve for alternately connecting said hygrostat outlet line with the cooling medium valve and with said motor, said hygrostat regulating the pressure in its outlet line to actuate said pressure actuated valve and motor in response to the relative humidity in the room.

11. A control for an air conditioner having a spray chamber through which the air to be conditioned is passed, comprising means for heating the spray water, a reverse acting pressure actuated valve operable under relatively high pressure to admit a heating medium to said heating means, means for admitting a medium for cooling the spray water, a pressure actuated valve operable under reduced pressure to admit a cooling medium to said spray water, a damper mechanism adapted to admit fresh and return air to said spray chamber in inverse proportions, a motor operable under relatively high pressure to close the fresh air dampers and open the return air dampers, a source of pressure, a hygrostat in contact with the room air and responsive to room conditions connected with said source of pressure and having an outlet line, said hygrostat being responsive to increase the pressure in said outlet line as the room humidity decreases, said hygrostat outlet line being connected with said heating medium supply valve and means for alternatively connecting said outlet line with said cooling medium supply valve and said damper motor.

12. A control for an air conditioner having a spray chamber through which the air to be conditioned is passed, comprising means for heating the spray water, a reverse acting pressure actuated valve operable under relatively high pressure to admit a heating medium to said heating means, means for admitting a medium for cooling the spray water, a pressure actuated valve operable under reduced pressure to admit a cooling medium to said spray water, a damper mechanism adapted to admit fresh and return air to said spray chamber in inverse proportions, a motor operable under relatively high pressure to close the fresh air dampers and open the return air dampers, a source of pressure, a hygrostat in contact with the room air and responsive to room conditions connected with said source of pressure and having an outlet line, said hygrostat being responsive to increase the pressure in said outlet line as the room humidity decreases, said hygrostat outlet line being connected with said heating medium supply valve and a four-way cock adapted to connect said cooling medium supply valve with said outlet line and said damper motor with said source of pressure and vice versa.

13. A control for an air conditioner having a spray chamber through which the air to be conditioned is passed, and means for introducing heating and cooling mediums to raise and lower the saturated temperature of the air leaving the spray chamber, comprising valve means controlling said heating and cooling mediums, a source of pressure, a hygrostat connected with said source of pressure, and responsive to room conditions, an outlet line for said hygrostat, a deferred action relay connected with said hygrostat outlet line, and an outlet line for said relay operatively connected with and controlling said valve means, said relay varying the pressure in its outlet line from low to high in response to changes in pressure from intermediate to high in the hygrostat outlet line and vice versa.

14. A control for an air conditioner having a spray chamber through which the air to be conditioned is passed, means for introducing heating and cooling mediums to raise and lower the saturated temperature of the air leaving the spray chamber, pressure actuated valve means controlling said heating and cooling mediums, a source of pressure, a hygrostat connected with said source of pressure, an outlet line for said hygrostat, an amplifying relay controlled by the pressure in said hygrostat outlet line and connected with said source of pressure, and a relay outlet line, said relay outlet line being connected to and actuating said valve means.

15. A control for an air conditioner having a spray chamber, through which the air to be conditioned is passed, and means for introducing heating and cooling mediums to raise and lower the saturated temperature of the air leaving the spray chamber, comprising valve means controlling said heating and cooling mediums, a source of pressure, a hygrostat connected with said source of pressure, and responsive to room conditions, an outlet line for said hygrostat, a deferred action amplifying relay connected with said hygrostat outlet line and said source of pressure, and an outlet line for said relay operatively connected with and controlling said valve means, said relay supplying pressure from said source of pressure to said relay outlet line and varying the pressure in said relay outlet line from low to high in response to changes in pressure from intermediate to high in the hygrostat outlet line and vice versa.

16. A control for an air conditioner having a spray chamber through which the air to be conditioned is passed, means for introducing heating and cooling mediums to raise and lower the saturated temperature of the air leaving the spray chamber, a heater for heating the saturated air before it is discharged from the conditioner, pressure actuated means controlling the introduction of said heating and cooling medium and a valve controlling said heater, including a source of pressure, a hygrostat responsive to room conditions and connected with said source of pressure, a thermostat responsive to room conditions and receiving pressure from said hygrostat and actuating said heater valve, and means responsive to the action of said hygrostat for controlling pressure actuated controlling means for said heating and cooling mediums in response to room relative humidity, and said elements being so organized that at room temperatures at or below the temperature for which the thermostat is set, said heater is controlled by said thermostat and at higher temperatures, said heater is controlled by said hygrostat.

17. A control for an air conditioner having a spray chamber through which the air to be conditioned is passed, means for heating the spray water, a pressure actuated valve controlling the spray water heating medium, means for cooling the spray water, a pressure actuated valve controlling the cooling medium, a damper mechanism adapted to admit fresh and return air to said spray chamber in inverse proportions, a motor actuating said damper mechanism, a heater for heating the air leaving said spray chamber, and pressure actuated means controlling said heater, including a source of pressure, a hygrostat responsive to room conditions and connected with said source of pressure, a hygrostat outlet line connecting said hygrostat with said spray water heating medium valve, a valve movable to alternately connect said hygrostat outlet line with said spray water cooling medium valve and said motor, said hygrostat regulating the pressure in its outlet line to actuate said spray water heating and cooling medium valves and said motor in response to the relative humidity in the room, a thermostat responsive to room conditions and receiving pressure from said hygrostat outlet line, and a thermostat outlet line connected with said pressure actuated heater valve, said elements being so organized that at room temperatures at or below that for which the thermostat is set, said heater is controlled by said thermostat, and at higher temperatures, said heater is controlled by said hygrostat.

18. A control for an air conditioner having a spray chamber through which the air to be conditioned is passed, means for introducing heating and cooling mediums to raise and lower the saturated temperature of the air leaving the spray chamber, a heater for heating the saturated air before it is discharged from the conditioner, pressure actuated means controlling the introduction of said heating and cooling mediums, and a valve controlling said heater, including a source of pressure, a hygrostat responsive to room conditions and connected with said source of pressure, a hygrostat outlet line, a deferred action amplifying relay connected with said hygrostat outlet line and said source of pressure, an outlet line for said relay operatively connected with and controlling said means controlling the introduction of said heating and cooling mediums, said relay supplying pressure from said source of pressure to said relay outlet line from low to high in response to changes in pressure from intermediate to high in the hygrostat outlet line and vice versa, and a thermostat responsive to room conditions and receiving pressure from said hygrostat outlet line and actuating said heater valve, said elements being so organized that at room temperatures at or below the temperature for which the thermostat is set to maintain said heater is controlled by said thermostat and at higher temperatures, said heater is controlled by said hygrostat.

19. In combination with an air conditioner having air conditioning means and a suction fan for forcing the air through said conditioning means, a control instrument arranged in the atmosphere to be conditioned and an independent conduit connecting the suction of said fan with said instrument for drawing a current of air from the atmosphere to be conditioned and past the sensitive parts of said instrument.

20. In combination with an air conditioner or the like having a casing and a fan for forcing air through said casing, means for altering the condition of the air passing through said casing, an instrument carried by said casing, said instrument being responsive to room conditions and controlling said means for altering the condition of the air passing through said casing, of means forming an independent conduit through the wall of said casing between the atmosphere and said fan and passing the sensitive parts of said instrument whereby room air is drawn past the sensitive parts of the instrument by said fan to accelerate their action.

21. In combination with an air conditioner having a casing forming a spray chamber and a suction chamber, a fan arranged in said suction chamber and forcing air through said casing, and conditioning means for altering the condition of the air passing through said casing, a hollow instrument board carried by said casing, and an instrument arranged on said instrument board and controlling said conditioning means in response to room conditions, said instrument board and casing being provided with ports whereby room air is drawn through said instrument and past the sensitive parts thereof, through said instrument board and into said suction chamber by said fan.

22. In combination with an air conditioner having a casing forming a spray chamber and a suction chamber, means for varying the saturated temperature of the air leaving the spray chamber, a heater for subsequently raising the temperature of said saturated air, and a fan in said suction chamber for forcing air through said conditioner and discharging it into said room, a hollow instrument board carried on the exterior of said casing adjacent said suction chamber, a hygrostat and a thermostat mounted on said instrument board and controlling said means for varying the saturated temperature of the air leaving said spray chamber and said heater in response to room conditions, and means for drawing a current of room air past the sensitive parts of said thermostat and hygrostat, comprising ports provided in said instruments, instrument board and casing whereby a current of air is drawn through said thermostat and hygrostat, instrument board and suction chamber by said fan.

23. An air conditioner, comprising a casing forming a spray chamber and a suction chamber, air pressure actuated means for varying the saturated temperature of the air leaving the spray chamber, a heater for subsequently raising the temperature of said saturated air, air pressure actuated means for controlling said heater, a fan arranged in said suction chamber for forcing air through said conditioner and discharging it into said room, a shaft supporting said fan and journaled in said casing, a motor driving said shaft, an air pressure actuated hygrostat and an air pressure actuated thermostat controlling said air pressure actuated means, an air compresser mounted on said casing and forming a source of pressure for said hygrostat and thermostat and means for driving said compresser from said fan shaft.

In testimony whereof I hereby affix my signature.

CLAUDE A. BULKELEY.